Oct. 23, 1951 D. V. HEALY 2,572,144

AUTOMATIC RATE OF SPEED-CHANGE SIGNAL SYSTEMS

Filed July 11, 1947 5 Sheets-Sheet 1

INVENTOR.
DONALD V. HEALY
BY
Darby & Darby.
ATTORNEYS

Oct. 23, 1951 D. V. HEALY 2,572,144

AUTOMATIC RATE OF SPEED-CHANGE SIGNAL SYSTEMS

Filed July 11, 1947 5 Sheets-Sheet 2

INVENTOR.

DONALD V. HEALY

BY

Darby & Darby

ATTORNEYS

Oct. 23, 1951 D. V. HEALY 2,572,144

AUTOMATIC RATE OF SPEED-CHANGE SIGNAL SYSTEMS

Filed July 11, 1947 5 Sheets-Sheet 3

INVENTOR.
DONALD V. HEALY
BY
Darby & Darby
ATTORNEYS

Oct. 23, 1951 D. V. HEALY 2,572,144

AUTOMATIC RATE OF SPEED-CHANGE SIGNAL SYSTEMS

Filed July 11, 1947 5 Sheets-Sheet 4

INVENTOR.
DONALD V. HEALY
BY
Darby & Darby
ATTORNEYS

Oct. 23, 1951 D. V. HEALY 2,572,144

AUTOMATIC RATE OF SPEED-CHANGE SIGNAL SYSTEMS

Filed July 11, 1947 5 Sheets-Sheet 5

INVENTOR.
DONALD V. HEALY
BY
Darby & Darby
ATTORNEYS

Patented Oct. 23, 1951

2,572,144

UNITED STATES PATENT OFFICE 2,572,144

AUTOMATIC RATE OF SPEED-CHANGE SIGNAL SYSTEM

Donald V. Healy, Gardiner, N. Y.

Application July 11, 1947, Serial No. 760,467

11 Claims. (Cl. 177—311.5)

This invention comprises an automatic signalling system for indicating in steps the rate of acceleration and deceleration of moving objects such as, for example, vehicles.

The invention comprises a combination for automatically signalling or indicating in steps the rate of change in the speed of movement of moving objects and particularly vehicles.

An object of this invention is to provide in such a system a signal for indicating whether a vehicle is standing still, backing up, traveling at a constant speed, accelerating or decelerating, and in the case of speed-change to indicate approximate rate of speed-change.

A more specific object of the invention is to provide a system which gives instantaneous indications of the above listed operating conditions.

Another object of the invention is to provide an automatic system which operates in response to changes in the vehicle speed without requiring any conscious act on the part of the vehicle operator.

Other and more detailed objects of the invention will be apparent from the following description of the several embodiments illustrated in the attached drawings.

This invention resides substantially in the combination, construction, arrangement and relative location of parts, all as will be hereinafter described.

In the accompanying drawings—

While the apparatus herein disclosed is particularly useful in connection with the operation of automobiles and the details of description of the apparatus in operation will be related to automobiles, it will be clear as the disclosure progresses that some parts of the system are useful in indicating the rate of change of speed of operation of many types of machines where such information is useful.

In the operation of automobiles under present day conditions, it is very desirable to have some system, preferably automatic, for indicating whether, at least to a rough degree, a preceding automobile is travelling at a constant rate of speed or at a changing rate of speed. With the advent of the fluid drive, the hydromatic drive, the high compression engine, the increased automobile power-to-weight ratio, and the present day high traffic density, the conventional stop-light has become entirely inadequate. The reason for this is that most of the previously mentioned factors tend to increase the friction horsepower of the automobile drive system making it possible for an operator to slow up a car rapidly by merely taking his foot off of the accelerator and coasting on a level road. Such deceleration is not indicated, of course, by the conventional stop-light since the foot brake is not applied. In fact, a modern car travelling at fifty miles an hour will decelerate at a rate when coasting in high gear which is equivalent to the maximum rate at which this car may be accelerated when applying full power at this same speed. In more technical terms, at fifty miles per hour a rate of deceleration of 2.93 feet per second$^2$ may be effected on a level highway without giving any warning to following traffic that the vehicle is slowing up. In the case of closely following vehicles and especially in heavy traffic, such rapid deceleration frequently requires an immediate and heavy application of the brakes, causing the following traffic to pile up and in many cases resulting in accidents.

The prime object of this invention is to provide an automatically operating rate of change of speed signalling system for automobiles which will give the operator of following vehicles a sufficiently rapid and accurate indication of the rate of change of speed so that he can act accordingly.

Figure 1:
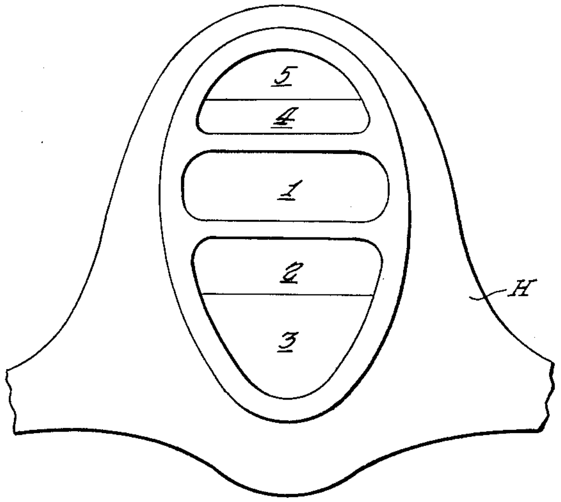
Figure 1 is an elevational view of a suitable form of signal device for use with this invention.
Figure 4:
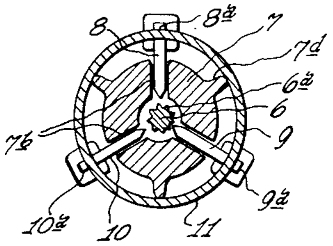
Figure 4 is a cross sectional view taken on the line 4—4 of Figure 2.
Figure 2:
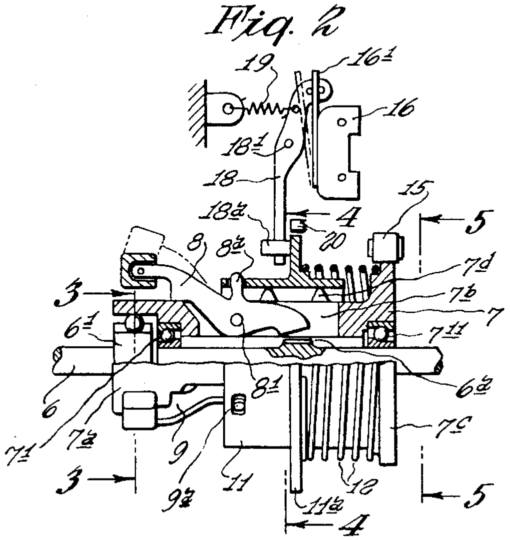
Figure 2 is a side elevational view with some parts in cross section of the override control forming part of the system.
Figure 5:
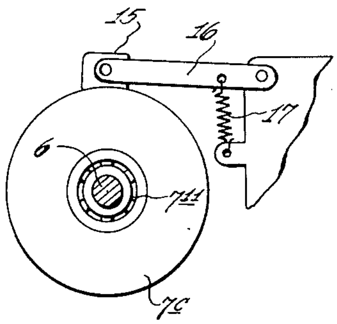
Figure 5 is a right hand elevational view of Figure 2 from the plane 5—5.

In accordance with this system the rear end of the vehicle is provided with a suitable fixture such as the housing H of Figure 1, constructed to provide a series of display areas 1, 2, 3, 4 and 5. In accordance with this system these areas are represented by colored targets as, for example, an amber glass in the case of area 1, red glass in the case of areas 2 and 3, and green glass in the case of areas 4 and 5. These areas represent compartments, each of which contains an incandescent lamp for individually illuminating them. This signal device will be used in addition to the usual rear and stop-lights now employed.

In accordance with this invention, the amber lens 1 will be illuminated when the vehicle is travelling at a constant rate of speed. The lens 2 will be illuminated if the vehicle is decelerating at some predetermined rate as, for example, 2.10 feet per second$^2$ or greater. The lens 3 will be illuminated if the vehicle is decelerating at a rate of 4.2 feet per second$^2$ or greater. The green lens 4 will be illuminated for an acceleration of 1.40 feet per second$^2$ or greater and the green lens 5 for an acceleration of 2.26 feet per second$^2$ or greater. As will be explained later, the system is arranged so that the amber lens 1 remains lighted until the deceleration or acceleration of the vehicle is sufficient to be indicated by the red or green lenses. At this point it may be noted that in some cases only one red and only one green lens may be sufficient and in other cases more than two red and green lenses may be necessary. Further, in accordance with this system the amber lens goes dark at the time any one of the red or green lenses is illuminated. Thus, should one of the lamps for the red or green lenses be burned out, some indication of value is given by the indication provided by the dark amber lens.

In order to avoid the possibility of erroneous indications which take place when the vehicle is backing up or standing at rest, an override control is provided. This part of the device causes the red lenses 2 and 3 to be illuminated when the vehicle is standing at rest or backing up. This feature is of particular value in eliminating night driving hazards. Thus, the override control device is provided to sense and distinguish between when the vehicle is travelling backward or forward, backing up or standing still. This comprises a major element of the system.

A second major element of the system is the device for sensing speed changes which can be calibrated and used to control the signalling lamps referred to.

The system also includes two secondary elements. The first is that for rendering the system operative for a certainty and the second is the actual indicating device described in connection with Figure 1.

A suitable form of override control device for general application as well as for use on automotive vehicles is illustrated in detail in Figures 2 to 5, inclusive. The shaft 6, to be connected in or to form a part of the speedometer drive shaft, is journalled in a suitable support, not shown. As the speedometer drive shaft is commonly directly coupled to the rear wheels of the vehicle, its speed of rotation is proportional to the speed of rotation of the rear wheels. Journalled on this shaft in suitable bearings, such as the bearings 7′ and 7″, is a housing or cage 7, provided in the case illustrated with three longitudinal slots 7$^b$ in the wall. Pivotally mounted in these slots are the flyball governor arms 8, 9 and 10, the first of which is illustrated as pivotally mounted at 8′ in Figure 2. The housing 7 is provided with a series of radial projections 7$^d$ on which a sleeve 11 may slide. The levers 8, 9 and 10 are each provided with projections 8$^a$, 9$^a$ and 10$^a$ respectively which lie in apertures in the sleeve 11 as is clear from Figures 2 and 4. The sleeve 11 is provided with a peripheral flange 11$^a$ and the cage 7 is provided with a similar flange 7$^c$. Lying between these flanges is a compression spring 12 which tends to resist sliding movement to the right of the sleeve 11 on the projections 7$^d$. The shaft 6 is provided with longitudinal teeth 6$^a$ in the region of the adjacent ends of the flyball levers. Pivotally mounted on any suitable adjacent support is a lever 16 which is provided with a friction shoe 15 positioned to frictionally engage the flange 7$^c$ under the force of spring 17. Likewise pivotally mounted on 18′ on a suitable adjacent support is a lever 18 provided with a roller 18$^a$ on its end adjacent the flange 11$^a$. A spring 19 urges the lever in a direction to cause engagement between the roller 18$^a$ and flange 11$^a$. The other end of the lever 18 engages the actuator bar 16′ of a suitable switch 16, which is preferably of the so-called microswitch type.

Figure 3:
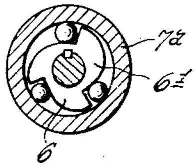
Figure 3 is a cross sectional view taken on the line 3—3 of Figure 2.

The cage 7 is provided with a cylindrical extension 7$^a$ forming a part of an overrunning clutch which includes a toothed member 6′ and balls, as clearly shown in Figure 3. This overrunning clutch is of well known cam and ball variety through which the housing 7 is driven in one direction so that it rotates on its bearings 7′ and 7″.

The whole purpose of this governor type override control device is to distinguish between forward motion, at rest, and reverse motion. As will be explained later, this device is so calibrated that when the vehicle is moving forward at less than a certain minimum velocity, the acceleration indicating circuits are inoperative and the red lenses will continue to be illuminated. For example, when the vehicle is moving forward at speeds less than three miles per hour the red lenses will remain illuminated providing a safety factor for the system.

When the vehicle proceeds in a forward direction at a speed greater than three miles per hour the flyball arms will begin to pivot outwardly and will cause the sleeve 11 to move proportionally to the right against the resistance of the calibrated spring 12. Thus, as soon as the vehicle gets above a speed of three miles per hour, sleeve 11 will assume a position such that lever 18 will actuate the switch 16 to open the circuit controlled by it and extinguish the red lights. As soon as this occurs, it is desirable, to save wear, that the roller 18$^a$ disengage the flange 11$^a$ and for that purpose a stop 20 is provided to be engaged by the lever 18 as sleeve 11 moves further to the right. As the vehicle speeds up, the ends of the flyball governor levers will engage the teeth 6$^a$ of shaft 6, locking these parts together to insure that the override governor will follow rapid deceleration without coasting.

When the vehicle is backing up the speedometer shaft 6 will be driven in the opposite direction rendering the overrunning clutch ineffective to drive the housing 7. To further insure that this housing will not rotate because of inherent friction in the clutch the friction shoe 15 is provided. It will be understood that switch 16 is closed when the vehicle is standing still or is at rest so that the red lenses will be illuminated. The circuit arrangements for effecting these results will be described later. Switch 16 opens and remains open as soon as the vehicle exceeds a speed of three miles per hour in a forward direction.

The mechanism of Figures 2 to 5, inclusive, is readily adaptable for use on any mechanism wherein it is desired to actuate a signal or control device in accordance with changes in direction of rotation of the control element and the rotational speed thereof.

While the complete system of this invention can take many forms the disclosure will be limited to illustrating two inertia operated types although electrical and fluid pressure operated types are possible.

Figure 6:
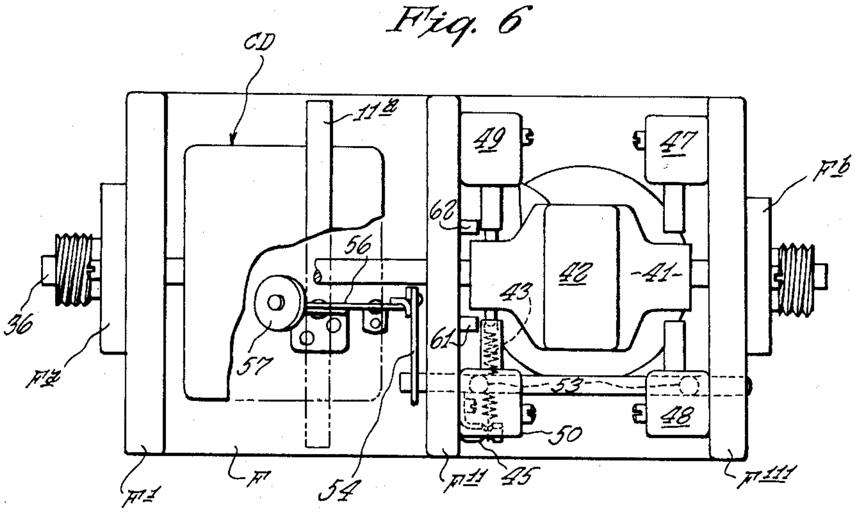
Figure 6 is a top plan view of the inertia switch actuated mechanism forming a part of the system.
Figure 7:
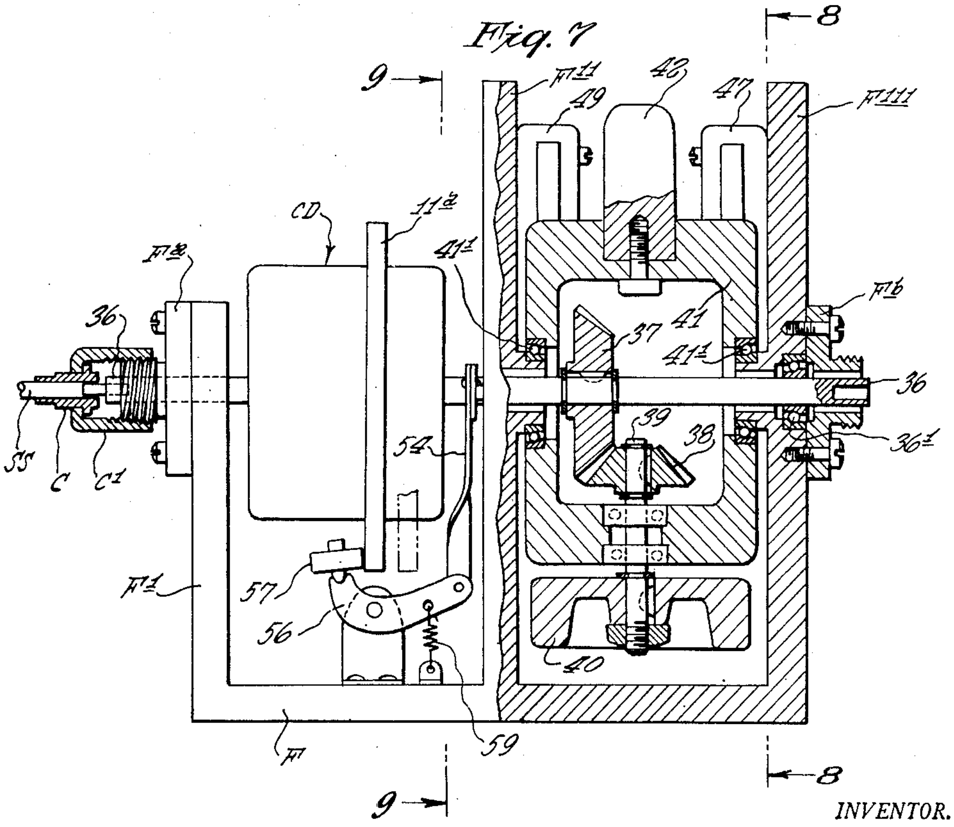
Figure 7 is a side elevational view of this mechanism with a portion in vertical central cross section.

The first inertia operated type is illustrated in full detail in Figures 6 to 9, inclusive. This device includes a frame or support F which, in the form shown, has three uprights or standards F′, F″, and F‴. Journalled in these standards is a shaft 36 for which one of the bearings is shown at 36′. It is intended that this shaft be connected in the speedometer drive of the vehicle and for this purpose a pair of fixtures FA and FB are secured to the outer faces of standards F′ and F‴. The speedometer shaft SS is provided with a coupling end C for engaging the end of the shaft 36. A suitable attaching sleeve C′ threadedly engages the fixture FA and holds the parts in driving relation as shown in Figure 7. The other end of the shaft will be coupled into the speedometer drive in the same way. The override control device is indicated generally at CD and is similar to that previously described although the manner in which it is used is different as will be explained below. An inertia cage or housing 41 is rotably mounted on the axis of shaft 36 by means of the bearings 41′. A countershaft 39 is journalled in this housing. Secured to one end of the shaft is a flywheel 40 and to the other end a bevel gear 38 which meshes with a bevel 37 keyed to the shaft 36. Secured to the opposite side of the housing 41 is a counterweight 42.

The housing 41 is held at rest in a centered position by means of springs 43 and 44 whose outer ends are attached to adjustable brackets 45 and 46, respectively. The tension at these respective springs can be adjusted by means of the screw and slot mounting for the brackets. A pair of fixed stops 61 and 62 on the standard F″ serve to limit the rotative movement of the housing 41 in either direction. Positioned on opposite sides of the housing 41 at its upper end are the four microswitches 47, 48, 49 and 50. Their relative position is indicated in Figure 6 which is such that switches 47 and 49 are operated for one direction of movement of the housing 41 and switches 48 and 50 are operated for the opposite direction of movement thereof. Each of these switches is provided with an actuator arm as shown and the switches are mounted in such a way that they can be relatively positioned with respect to the housing 41 so that they can be sequentially operated as will be explained later.

Figure 9:
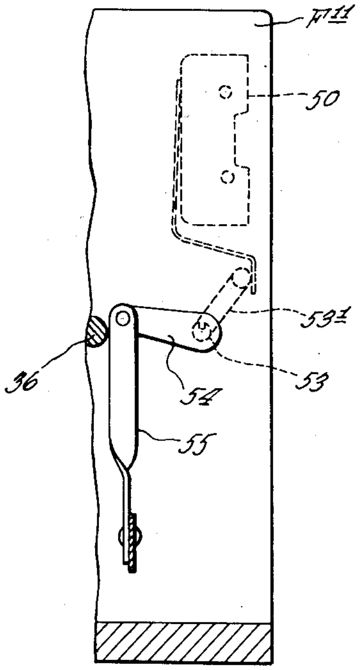
Figure 9 is a cross sectional view taken on the line 9—9 of Figure 7.
Figure 8:
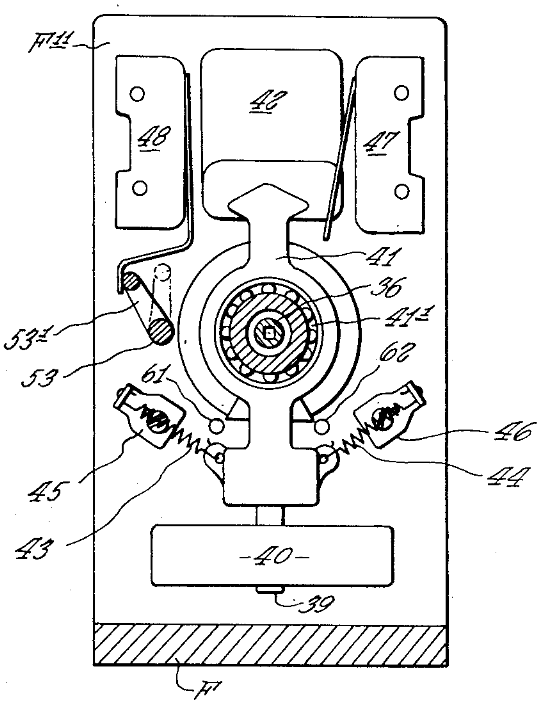
Figure 8 is a cross sectional view taken on the line 8—8 of Figure 7.

Journalled in the standards F″ and F‴ is a shaft 53 provided with a pair of projections 53′ positioned to engage the actuator arms of the switches 48 and 50. Referring to Figure 9, it will be seen that shaft 53 is provided with a crank arm 54 pivotally connected by a link 55 to a double-ended lever 56 pivotally mounted on a suitable support as shown in Figure 7. The lever 56 is provided with a roller 57 to engage the flange 11ᵃ of the override control device and is spring loaded by means of the tension spring 59.

Figure 10:
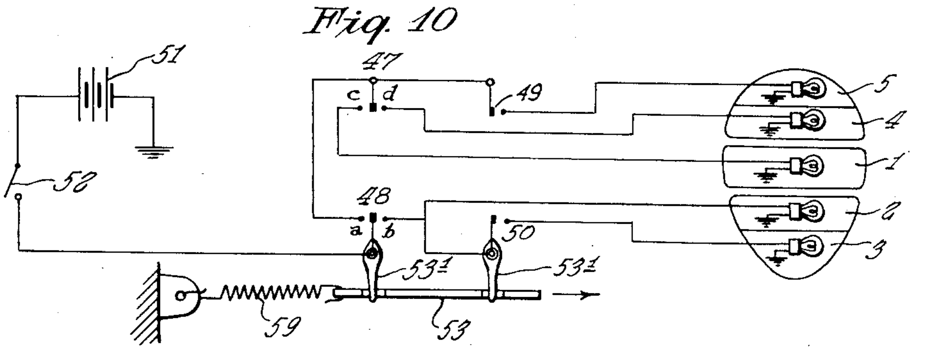
Figure 10 is a schematic and diagrammatic illustration of the circuit of this system.
Figure 11:
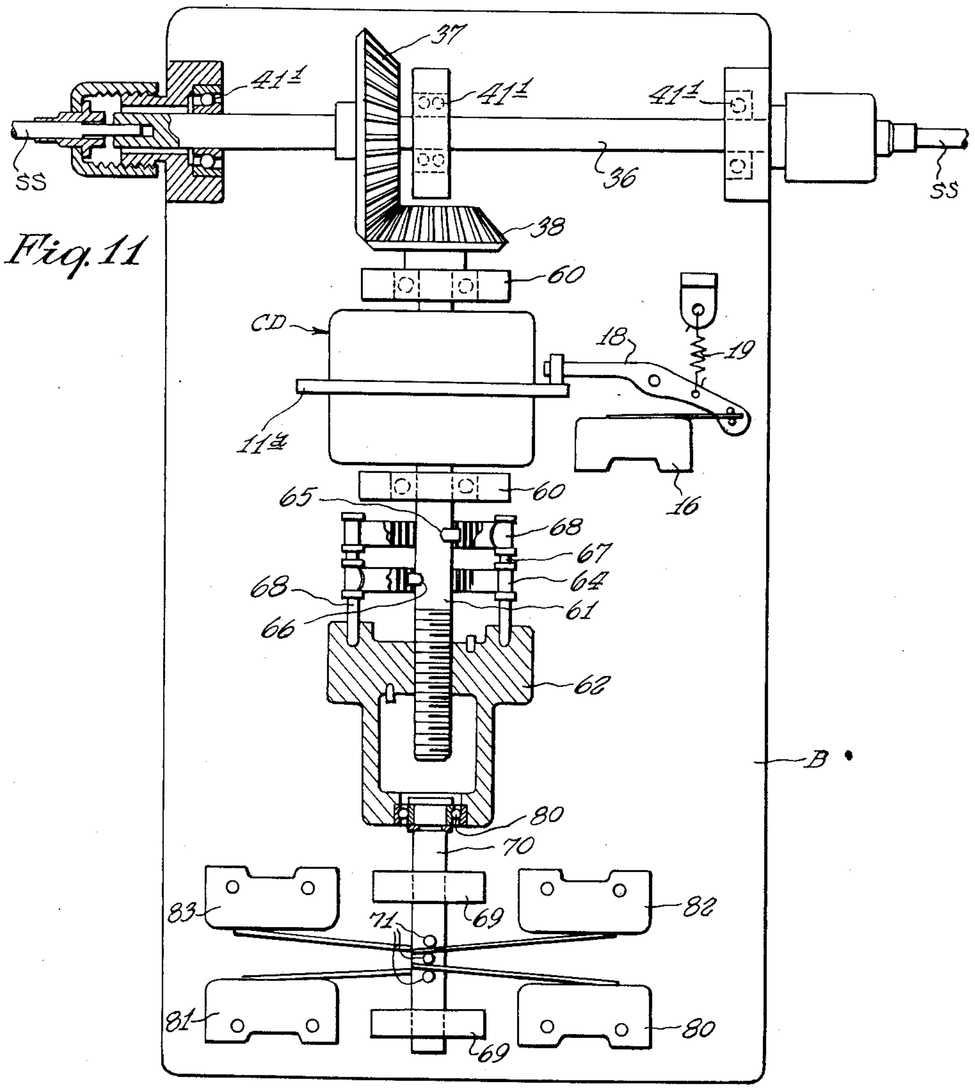
Figure 11 is a top plan view with some parts in section of a modified form of inertia actuated mechanism for operating the control switches, the sectional parts being on the line 11—11 of Figure 12.
Figure 12:
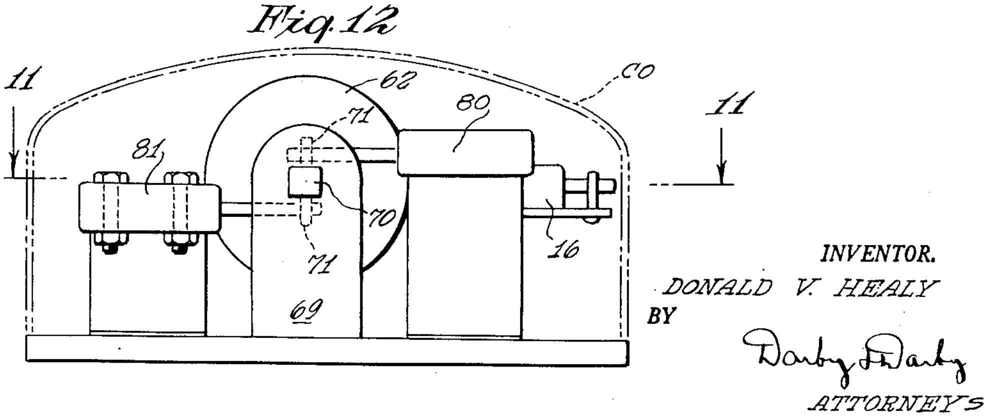
Figure 12 is an end elevational view of the mechanism of Figure 11.
Figure 13:
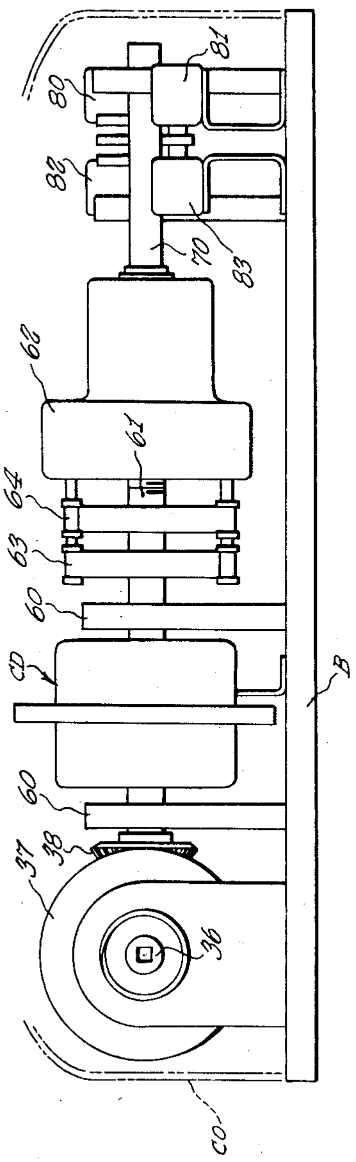
Figure 13 is a side elevational view of the same mechanism.

The circuit arrangement for this mechanism is illustrated in Figure 10. A suitable current source such as the battery 51 of the car is connected through a switch 52 to the movable contact of switch 48 which is a single-pole double-throw switch having fixed contacts *a* and *b*. Preferably, the switch 52 may be made a part of the ignition system of the vehicle so that the signalling system will be rendered operative and inoperative as the vehicle is put into and taken out of operation. Contact *a* of switch 48 is connected to the movable contact of switches 47 and 49 of which the former is a single-pole double-throw switch and the latter a single-pole single-throw switch. The fixed contact *c* of switch 47 is connected to the grounded lamp 1 for the amber lens. The fixed contact *d* of that switch is connected to the grounded lamp for the green lens 4. The other contact of switch 49 is connected to the grounded lamp for the green lens 5. The contact *b* of switch 48 is connected to the movable contact of the single-pole single-throw switch 50 and to the grounded lamp for the green lens 2. The fixed contact of switch 50 is connected to the grounded lamp of the green lens 3. In this figure there is diagrammatically illustrated rather simply the manner in which the override control mechanism operates the switches 48 and 50 through the shaft 53. Switches 47 and 49 and switches 48 and 50 are operated by the housing 41 in a manner to be described.

The movable contact of switch 48 normally engages the contact *b* and switch 50 is closed. Switches 49 and 50 are mounted on the support in relation to switches 47 and 48 so that switch 47 or 48 is first operated by the movement (depending on its direction) of housing 41, and switch 49 or 50 is later operated by further movement (depending on its direction) of that housing. For example, switch 48 is positioned so as to be operated from that normal position to engage contact *b* for decelerations of 2.1 feet per second$^2$ or greater. Switch 50 is set to close for decelerations of 4.20 feet per second$^2$ or greater. Switch 47 is set to move from its normal position from contact *c* to contact *d* for accelerations of 1.40 feet per second$^2$ or greater and switch 49 is set to close for accelerations of 2.26 feet per second$^2$ or greater. These values are by way of examples for of course the apparatus may be adapted for similar operation for different rates of speed-change.

A description of the operation of this system will now be set forth in detail. It will be assumed that the vehicle is at rest and the ignition off at which time, of course, switch 52 is open. The system of this invention is put in operation by closing switch 52 which, as previously stated, may be made a part of the ignition switch. As soon as switch 52 is closed, both red lenses 2 and 3 will be illuminated, which results because the movable contact of switch 48 engages contact *b* and switch 50 is closed as previously mentioned. These switches are in this condition because the override control mechanism is at rest which means that in the case of the system of Figures 6 to 9, inclusive, the switches have been operated to this position through the mechanical interconnection between the override control device and these switches. This condition is illustrated, for example in Figure 7 where the shaft 53 is moved to a position where its arms 53' have actuated the switches 48 and 50 to this position. This is a good point to note that the override control system of Figures 6 to 9, inclusive, effects a mechanical control of switches 48 and 50 of this circuit as distinguished from the more generalized arrangement of Figure 2 where the override control mechanism controls a separate switch 16 to accomplish the same purpose. In other words, in the arrangement of Figure 7, the deceleration switches 48 and 50, working conjointly, perform the same function as the switch 16 of Figure 2. In the modification of Figures 11 to 15, inclusive, a circuit similar to that of Figure 10 is shown in which case, however, there is included in addition, a switch corresponding to the switch 16 of Figure 2. It is also well to note at this point that in addition to causing both red lenses 2 and 3 to be illuminated when the vehicle is standing still they will also be illuminated when the vehicle is backing up. This results because of the overrunning clutch incorporated in the drive for the device. When the vehicle is backing up the overrunning clutch is inoperative and, hence, the override control device remains in its normal position, that is, the position shown in Figure 7.

The spring 12 in the override control device which, in the arrangement of Figure 7 is of course the same as that of Figures 2 to 5, inclusive, with the exception of the difference noted above, is calibrated so that the travel of the sleeve 11 will be a function of the speed of the shaft 36 which in turn is a function of the speed of the vehicle. It is proposed that the device will be set so that a minimum speed of three miles per hour, for example, must be attained in a forward direction before the override control device will actuate the switches 48 and 50 so that the red lenses will go dark. In other words, the red lenses will remain illuminated until the vehicle speed in a forward direction exceeds three miles per hour. As soon as this speed is exceeded the override control device will move to the right as indicated by the dotted lines of the flange $11^a$ in Figure 7 so that spring 59 will operate the linkage system and shaft 53, so that switch 48 and 50 will be actuated. Switch 50 will open and the movable contact of switch 48 will move to engage contact *a*. Thus, the red lenses will go dark. The movable contact of switch 47 is normally in engagement with its contact *c* so that when the movable contact of switch 48 engages contact *a* the amber lens 1 will be illuminated. This condition will persist until the vehicle attains a rate of acceleration of 1.40 feet per second$^2$ or greater whereupon the flywheel inertia reaction of the rotating flywheel 40, Figure 8, will tip the housing 41 counterclockwise, Figure 8, causing switch 47 to be operated. The movable contact of this switch will engage contact *d*, extinguishing the amber light 1 and causing the green lens 4 to be illuminated. If the acceleration of the vehicle reaches 2.26 feet per second$^2$ or greater, housing 41 will tip further in a clockwise direction and cause switch 49 to close whereupon the green lens 5 will be illuminated and green lens 4 will remain illuminated. In either of these speed zones, if the vehicle stops accelerating and continues to travel at a constant speed, the housing 41 will return to normal position and be centered by the springs 43 and 44. Thus, switch 49 will open and the movable contact of switch 47 will return into engagement with contact *c*. This, of course, will cause the amber lens to be illuminated. Thus, at any vehicle speed if the speed is constant the amber lens will be illuminated and, of course, the red and green lenses will be dark.

Assuming that the vehicle is decelerating, if it decelerates at a rate of 2.10 feet per second$^2$ or greater the housing 41 will tip in a counterclockwise direction and the movable contact of switch 48 will engage its contact *b*, causing the red lens 2 to be illuminated. If the rate of deceleration of the vehicle is 4.2 feet per second$^2$ or greater housing 41 will tip further in a counterclockwise direction, closing switch 50 so that the lens 3 will be illuminated and of course lens 2 remains illuminated.

It will be seen that within the limits recited that minor variations in the rate of speed-change will not cause the red or green lenses to be operated but during these periods the amber lens 1 will remain illuminated.

As soon as the vehicle speed drops below three miles per hour the override control mechanism will cause the red lenses 2 and 3 to be illuminated in an obvious manner in view of the previous description.

The above description now justifies the statement previously made that the inertia frame 41 and its related parts provide a mechanism for sensing speed-change, be it either acceleration or deceleration and that, as a result thereof, the signal mechanism controlled thereby is capable of indicating the approximate rate of these changes within predetermined limits. As previously mentioned, one or more than two ranges may be provided by including additional switches and lenses in the signalling device.

It is believed that those skilled in the art will readily appreciate, without detailed description, how the frame 41 is caused to operate in the manner described. These operations result because of the flywheel inertia reaction to the increasing and decreasing speeds of rotation of the flywheel 40 which is geared to the speedometer shaft through the gears 37 and 38 and the shaft 36. The gears 37 and 38 can be regulated to cause any necessary step-up in the speed of rotation of the flywheel 40 with regard to the speedometer shaft speed.

The modification of Figures 11 to 15 will now be described in detail. In broad principle, this system is like that of the previous modification but is distinguished in that the inertia housing 62 in this modification is of a rotating type as distinguished from the oscillatory type of the previous modification. For sake of ease in following this description, similar parts have been given the same reference numerals. In this structure all the parts are mounted on a base B and a cover CO is provided. Journalled in the standards and bearings 41' is the shaft 36 intended to be connected into the speedometer shaft SS as before. Journalled in the bearings in standards 60 is a shaft 61 which lies at right angles to the shaft 36 and is interconnected therewith by means of the meshing bevel gears 37 and 38. The shaft 61 corresponds to the shaft 6 of the modification of Figure 2 and there is mounted thereon in the same relation and consisting of the same parts the override control device CD. The free end of shaft 61 is threaded as shown and threadedly mounted thereon is the inertia wheel or cage 62. The cage 62 is interconnected with the shaft 61 by a pair of opposed spiral springs 63 and 64. The inner end of spring 63 is anchored to the shaft 61 at 65 and the inner end of spring 64 is anchored to shaft 61 at 66. The wheel 62 is provided with a pair of projecting pins 67 and 68 lying on a diameter and to which the free ends 63' and 64' of the springs 63 and 64, respectively, are attached. These details of construction are well illustrated in Figure 14 and it will be seen that the two springs are mounted in an opposite sense so as to oppose each other. Slidably mounted in a pair of standards 69 is a bar 70 adapted to slide therein without turning and having a rotatable bearing connection 80 with the cage 62. A series of pins 71 project from the top and bottom of the bar 70 and between which the ends of the actuator bars of the microswitches 80, 81, 82 and 83 are secured. These switches are mounted on suitable supports as shown and are preferably positioned adjustably so that of the switches 80 and 81, switch 80 will be operated before switch 81 and of the switches 82 and 83, switch 82 will be operated before the switch 83. The switches 80 and 81 are the acceleration control switches and, as before, the lenses 4 and 5 are the green lenses. Similar switches 82 and 83 are the deceleration switches and the lenses 2 and 3 are the red lenses, see Figure 15.

Figure 15:
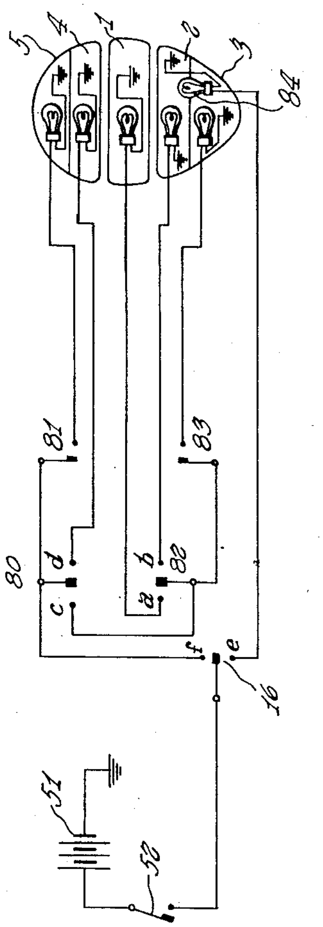
Figure 15 is a diagrammatic and schematic illustration of the circuit used with this modification.
Figure 14:
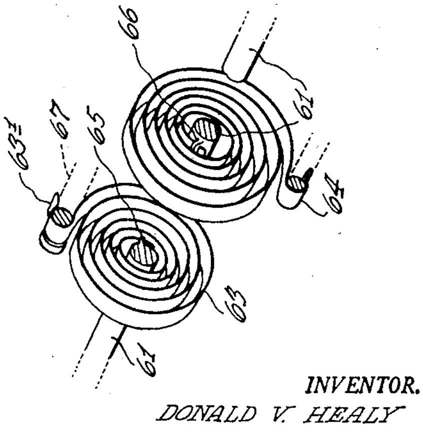
Figure 14 is a perspective view showing a detail of the structure of Figures 11, 12 and 13.

The circuits of Figure 15 are generally similar to those of Figure 10, but in this case it will be seen that switch 16 operated by the override control is now included in these circuits and an additional grounded signal lamp 84 is provided in the signal device. It is arranged so that it will illuminate both lenses 2 and 3. As in the previous case, movable contacts of switches 80 and 82 are normally closed on the fixed contacts *a* and *c*. The movable contact of switch 16 is normally closed on its contact *e*.

First, in describing the operation of this apparatus, it should be noted, so that there will be no doubt, that the overrunning clutch of the override control device is included in this operation and operates in the same way. Thus, as soon as the ignition is turned on, switch 52 is closed and the lamp 84 is energized, illuminating both red lenses 2 and 3. This condition continues until the vehicle reaches a speed of three miles per hour or greater, for example, whereupon the movable contact of switch 16 disengages contact *e* and engages contact *f*. As a result, lamp 84 is extinguished and the amber lamp is energized, the movable contacts of switches 80 and 82 normally engaging contacts *c* and *a*, respectively. Of course, as in the previous case, if the vehicle is backing up, lamp 84 remains energized.

As soon as the vehicle begins to accelerate at a predetermined rate, such as previously mentioned, the movable contact of switch 80 will disengage contact *c* and engage contact *d* whereupon the green lens 4 will be illuminated. If the acceleration attains the previously suggested higher rate, switch 81 will close and green lens 5 will be illuminated, green lens 4 remaining illuminated. On deceleration and in a similar way, switch 82 or 83 will be operated to energize or deenergize corresponding lamps of the red lenses 2 and 3.

The manner in which this structure actuates these switches will now be described. As the vehicle starts to move in a forward direction shaft 36 will revolve, causing shaft 61 to revolve and the override control device to be actuated. If the rate of acceleration reaches a predetermined value shaft 61 will rotate with respect to the cage 62 under the influence of springs 63 and 64 by a relative amount sufficient to cause the rod 70 to slide in a direction to first operate switch 80. At a higher rate of acceleration the rotational displacement of cage 62 will be greater and switch 81 will be actuated. As soon as the speed of the vehicle becomes stabilized and the acceleration rate falls below the minimum predetermined value the opposed springs 63 and 64 will cause relative rotation of the cage 62 on the shaft 61 to bring it back to a static stabilized condition at which time only the amber lens 1 will be illuminated. In a similar way, on deceleration, switch 83 will open, followed by the opening of switch 82, depending upon the limits set. With all of these descriptions it will be understood of course that if deceleration starts under conditions where the amber light is lit, the sequence of operation of switches 82 and 83 may be the reverse, namely, switch 82 will close first and then switch 83. It will likewise be understood in all cases of operation that acceleration or deceleration may be at such a rate that only one of the pairs of switches is operated or both may be simultaneously and continuously operated with passage through the intermediate condition very rapidly.

As it is common and in the case of the claims convenient to refer to acceleration as positive and deceleration as negative acceleration, the term acceleration will be used in this sense in the claims.

In view of the above detailed description of several embodiments of the invention it will be apparent that the apparatus selected to illustrate the subject matter of this invention is capable of many variations and I do not desire therefore to be strictly limited to the structures selected for illustrative purposes but only as required by the appended claims. As previously suggested, all electric and all pressure fluid operated types of systems may be devised in which the basic combination of elements will be the same.

What is claimed is:

1. A rate of speed-change indicating system comprising in combination, a signal device having at least two indicators, a rotatable shaft, the rate of change of speed of which is to be indicated, a member pivotally supported at its center of mass on the axis of said shaft, a flywheel rotatably mounted on said member on an axis at right angles to said shaft and normally lying in a vertical plane, and a gear train for driving said flywheel from said shaft, changes in the speed of rotation of said flywheel causing pivotal movement of said member to actuate one of said indicators for positive acceleration of said shaft of a predetermined value or greater, and to actuate the other of said indicators for negative acceleration of said shaft of a predetermined value or greater.

2. In the combination of claim 1, said signal device including electric lamps and circuits therefor and switches in said circuits actuated by said member.

3. A rate of speed-change indicating system comprising in combination a signal device having at least two indicators, a rotatable shaft, the rate of change of speed of which is to be indicated, means driven by said shaft for causing the actuation of one of said indicators for positive acceleration of said shaft of a predetermined value or greater and for causing actuation of the other of said indicators for negative acceleration of said shaft of a predetermined value or greater, a normally actuated third indicator, and means driven by said shaft for de-energizing said third indicator for speeds of rotation of said shaft in one direction only above a predetermined value.

4. In the combination of claim 3, a constant speed indicator controlled by said means for causing actuation thereof for all substantially constant speeds of rotation of said shaft in said one direction and above said last predetermined value.

5. A rate of speed-change indicating system comprising, in combination, at least two signal devices for indicating negative acceleration, at least two signal devices for indicating positive acceleration, a rotatable shaft, the rate of change of speed of which is to be indicated, a control device for each of said signal devices, means driven by said shaft in one direction of rotation for causing the selective actuation of said control devices to respectively actuate said signal devices to indicate two different rates of positive acceleration and two different rates of negative acceleration, and means actuated by said shaft for the other direction of rotation thereof for maintaining said negative acceleration signal devices actuated for all speeds.

6. In the combination of claim 5, said signal devices comprising signal lamps and said control devices comprising switches.

7. In the combination of claim 5, said second last means including a threaded rotatable shaft driven by said first shaft, an inertia wheel threadedly mounted on said shaft, spring means for resisting rotation of said wheel on said shaft in either direction, and means actuated by rotation of said wheel on said shaft for selectively actuating said control device.

8. A motion indicator for a vehicle comprising, in combination, a signal device normally energized when the vehicle is in motion in forward or reverse, a rotatable shaft rotatable in either direction depending upon the direction of the motion of the vehicle and means driven by said shaft for deenergizing said signal device only upon rotation of said shaft in the forward direction of said vehicle above a predetermined speed.

9. In the combination of claim 8, means driven by said rotatable shaft for energizing said signal device when said vehicle is decelerating at a rate above a predetermined value at speeds above said predetermined speed.

10. A rate of speed-change indicating system comprising in combination, a signal device having at least two indicators, a rotatable shaft, the rate of change of speed of which is to be indicated, a member pivotally supported at its center of mass, a flywheel rotatably mounted on said member, means for driving said flywheel from said shaft, pivotal movement of said member causing the actuation of one of said indicators for positive acceleration of said shaft of a predetermined value or greater, and for causing the actuation of the other of said indicators for negative acceleration of said shaft of a predetermined value or greater, a normally energized third indicator, and means also actuated by said shaft for all speeds in one direction of rotation only above a predetermined value for de-energizing said third indicator.

11. A rate of speed-change indicating system comprising in combination, a signal device having at least two indicators, a rotatable shaft, the rate of change of speed of which is to be indicated, a member pivotally supported at its center of mass on the axis of said shaft, a flywheel rotatably mounted on said member on an axis at right angles to said shaft and normally lying in a vertical plane, a gear train for driving said flywheel from said shaft, changes in the speed of rotation of said flywheel causing pivotal movement of said member to actuate one of said indicators for positive acceleration of said shaft of a predetermined value or greater, and to actuate the other of said indicators for negative acceleration of said shaft of a predetermined value or greater, a normally energized third indicator, and means also actuated by said shaft for speeds in one direction of rotation thereof above a predetermined value for de-energizing said third indicator, said third indicator remaining energized for all speeds of rotation of said shaft in the reverse direction.

DONALD V. HEALY.

REFERENCES CITED

The following references are of record in the file of this patent:

UNITED STATES PATENTS

| Number | Name | Date |
|---|---|---|
| 740,547 | Fiske | Oct. 6, 1903 |
| 1,486,517 | Grieten | Mar. 11, 1924 |
| 1,601,562 | Cox | Sept. 28, 1926 |
| 1,897,074 | Rees | Feb. 14, 1933 |
| 2,079,539 | White et al. | May 4, 1937 |
| 2,128,841 | Moore et al. | Aug. 30, 1938 |
| 2,234,309 | Kromholz | Mar. 11, 1941 |
| 2,408,711 | Volz | Oct. 1, 1946 |
| 2,433,585 | Warner | Dec. 30, 1947 |
| 2,462,655 | McHenry | Feb. 22, 1949 |

FOREIGN PATENTS

| Number | Country | Date |
|---|---|---|
| 193,874 | Great Britain | May 27, 1924 |